United States Patent
Davis, Jr.

[11] Patent Number: 6,149,492
[45] Date of Patent: Nov. 21, 2000

[54] MULTIFUNCTION GAME CALL

[75] Inventor: James Deff Davis, Jr., Dover, Ark.

[73] Assignee: Penline Production L.L.C., Dover, Ark.

[21] Appl. No.: 09/083,263

[22] Filed: May 22, 1998

Related U.S. Application Data

[63] Continuation-in-part of application No. 29/073,648, Jul. 14, 1997, Pat. No. Des. 395,837.

[51] Int. Cl.$^7$ ........................................ A63H 5/00
[52] U.S. Cl. ................. 446/397; 446/202; 446/203; 446/213; 446/215; 446/265; 446/418
[58] Field of Search ................. 446/213, 214, 446/215, 254, 265, 397, 404, 418, 202, 203

[56] References Cited

U.S. PATENT DOCUMENTS

| | | | |
|---|---|---|---|
| 3,009,285 | 11/1961 | Brown | 446/215 |
| 3,367,064 | 2/1968 | Anthony et al. | 446/397 |
| 3,772,821 | 11/1973 | Madden et al. | 446/215 |
| 4,003,159 | 1/1977 | Piper | 46/189 |
| 4,080,754 | 3/1978 | Nelson | 446/215 |
| 4,387,531 | 6/1983 | Jacob | 46/189 |
| 4,648,852 | 3/1987 | Wingate | 446/397 |
| 4,662,858 | 5/1987 | Hall | 446/397 |
| 4,836,822 | 6/1989 | Finley et al. | 446/397 |
| 4,932,920 | 6/1990 | Hearn | 446/397 |
| 4,941,858 | 7/1990 | Adams | 446/397 |
| 4,960,400 | 10/1990 | Cooper | 446/207 |
| 4,988,325 | 1/1991 | Alderson et al. | 446/397 |
| 5,019,008 | 5/1991 | Hughes | 446/207 |
| 5,178,575 | 1/1993 | Koch | 446/397 |
| 5,234,368 | 8/1993 | Carraway | 446/202 |
| 5,244,430 | 9/1993 | Legursky | 446/404 |
| 5,484,319 | 1/1996 | Battey | 446/397 |
| 5,484,320 | 1/1996 | Becker | 446/418 |
| 5,529,526 | 6/1996 | Wesley | 446/397 |
| 5,555,664 | 9/1996 | Shockley | 43/1 |
| 5,562,521 | 10/1996 | Butler et al. | 446/397 |
| 5,607,091 | 3/1997 | Musacchia | 446/404 |
| 5,846,119 | 12/1998 | Long | 446/397 |

FOREIGN PATENT DOCUMENTS 132481 of 1819 United Kingdom ................. 446/215

*Primary Examiner*—Sam Rimell
*Assistant Examiner*—Jeffrey D. Carlson
*Attorney, Agent, or Firm*—Stephen D. Carver

[57] ABSTRACT

A portable game call ideally adapted for turkey hunting is user transformable between a variety of configurations for producing selected, game-attractive sounds. A rigid supportive hub assembly, generally in the form of a parallelepiped at least temporarily mounts the remaining parts for transportation and storage. The hub assembly comprises an upwardly projecting dome that removably gimbel mounts a ring assembly. The removable ring assembly mounts two radially spaced apart, outwardly extending strikers that can be rubbed across a frictional striking surface on the call for making "peg and slate" sounds. An outwardly extending hollow metal suction tube located between the strikers makes "wing bone" sounds. An elongated, blade-like sounding vane removably coupled to the call is slidably received within a slot in the hub. A timing cord extending between the vane and the ring enables the vane, once removed, to be spun in the air by a hunter to produce the "Pulmonic Puff" sound of the wild turkey gobble. Preferably the vane has specially beveled edges that help produce the required sound. An optional box assembly comprises a sound box removably coupled to a striker for making "box call" sounds when rubbed against the frictional surface. Controlled, sweeping movements of the box are limited by rotation of the ring over the dome, and by special limiters on the sides of the box.

33 Claims, 10 Drawing Sheets

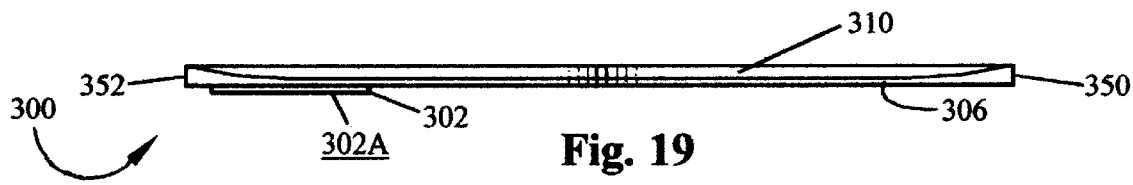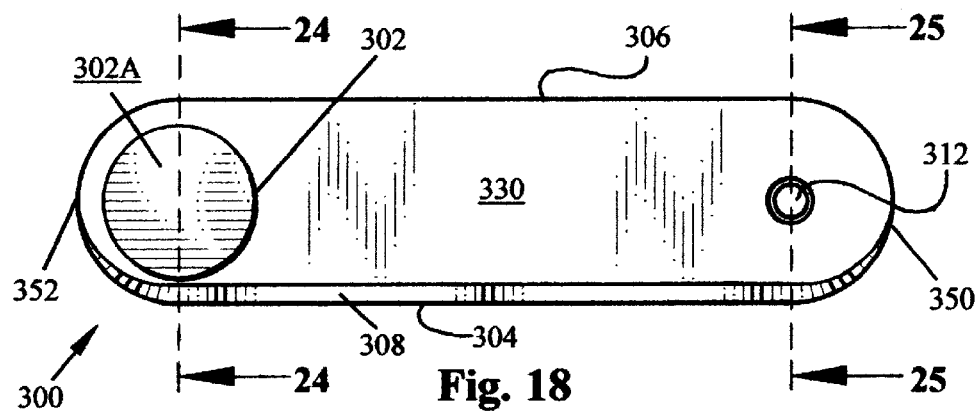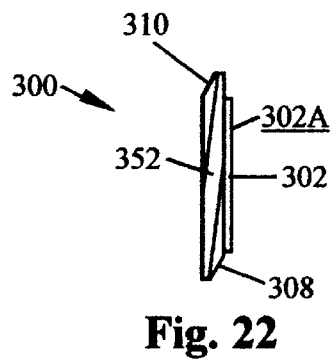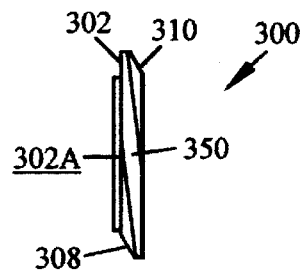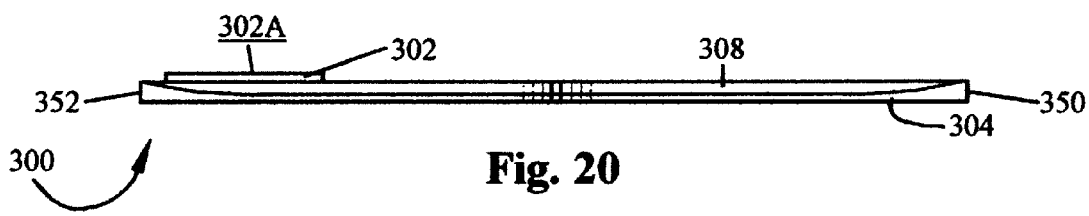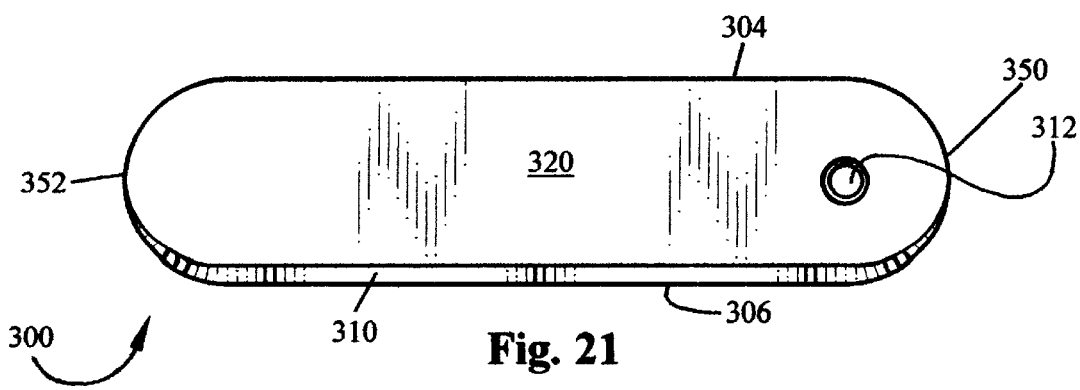

MULTIFUNCTION GAME CALL

CROSS REFERENCE TO RELATED APPLICATION

This application is a Continuation-in-Part of application Ser. No. 29/073,648, filed Jul. 14, 1997, Group Art Unit 2901, inventor James Deff Davis Jr., and entitled Multi-Function Game Call now U.S. Pat. No. Des. 395,837.

BACKGROUND OF THE INVENTION

I. Field of the Invention

This invention relates generally to hunting game calls. More particularly, this invention relates to wild turkey game calls adapted to make a variety of game-attracting sounds through the use of both friction and air.

II. Description of the Prior Art

All turkey calls today can be placed in one of two basic categories of operation: friction operated or air operated. Many patents have been granted for turkey calls that have at the essential core of their design one or the other of these two forms of operation, some examples of which are as follows:

| | |
|---|---|
| U.S. Pat. No. 5,484,319 | U.S. Pat. No. 4,387,531 |
| U.S. Pat. No. 5,562,521 | U.S. Pat. No. 4,003,159 |
| U.S. Pat. No. 5,529,526 | U.S. Pat. No. 4,988,325 |
| U.S. Pat. No. 5,234,368 | U.S. Pat. No. 4,960,400 |
| U.S. Pat. No. 5,178,575 | U.S. Pat. No. 4,932,920 |
| U.S. Pat. No. 4,836,822 | |

One turkey call incorporates more than one variation of a single category in one call assembly, and that is the friction turkey call disclosed in U.S. Pat. No. 3 4,941,858 issued Jul. 17, 1990 to Mark C. Adams. Turkey calls which offer the combination of friction and air operation in one call assembly are absent in the art. Two examples of a friction and air combination were found for calling or attracting deer and are shown and described in U.S. Pat. No. 5,019,008, to Hughes and U.S. Pat. No. 5,555,664 to Shockly. However, it is not possible to produce any sounds the turkey makes with these deer calls.

The prior art reflects the popularity of both friction and air operated turkey calls, and if one wishes to have all the advantages of both at hand, he is forced to purchase and carry at least one of each type to the field. Therefore, it has become a common problem for the more skilled at turkey calling to be over burdened with singular type calling devices of both forms when in the field.

Also, there exists an important turkey sound that has never been effectively reproduced by any turkey call until the present invention. That sound is described by scientists as the "Pulmonic Puff" and by hunters as simply "drumming". A close phonetic approximation of the sound would be " . . . v-oo-r-r-r-r-o-o-m-mi . . . " The sound typically is one and one half seconds in duration. It is impossible to coin a combination of letters that will imitate this sound precisely. To those less phonetically adept, the sound might resemble the sound of an engine of a distant motor vehicle being revved up. Also, it could be compared closely to the sound a ruffed grouse makes as it beats its wings together rapidly while sitting on a hollow log.

The pulmonic sound is made by the gobbler expelling air from its lungs while at the same time exercising a rapid series of muscular tremors that impart a low frequency vibration to what would otherwise be an uninterrupted tone starting very low and ending a few decibels higher. In fact, the call is so low in frequency that it cannot be recorded without special recording equipment.

This "Pulmonic Puff" sound made by the wild turkey gobbler represents the last important call of the turkey to be reproduced today. It has remained so for as long as history can record because there was no means known that could reproduce it. The importance of the call is understood by all experienced turkey hunters. It is the chief sound produced by the turkey gobbler during the mating season. He makes this sound day and night. It is, for him, the safest sound he can make in order to attract hen turkeys to his location, and to ward off rivals.

Turkeys hear low frequency sounds much farther than humans and many animal predators. Turkeys switch from gobbling to the "Pulmonic Puff" soon after leaving the safety of the roost in the morning and continue to use this call throughout the day. The importance of this call to the hunter is twofold. First, from a personal safety standpoint, gobblers can hear this call much farther than hunters, unlike the other calls the turkey makes. Secondly, the gobbler will approach the hunter ill order to defend its territory from what he perceives as a rival. When lie has hens with him he most often will ignore a call that duplicates a hen, he will not tolerate the presence of a rival in his territory. The hunter could use the gobble call to accomplish this result, but he would be attracting hunters from great distances to his position and this could have dangerous consequences for him. The distance a hunter can hear the "Pulmonic Puff " is less than one hundred yards, while a turkey can hear it from as far away as an eighth of a mile. For producing the "Pulmonic Puff", the most important purpose of this multi-function call, there exists no known prior art.

This invention, like other friction operated calls (such as those disclosed in U.S. Pat. No. 2,629,968 issued on Mar. 3, 1953, to Herter and U.S. Pat. No. 3,716,943 issued on Feb. 20, 1973 to Orzetti), can be used to call other game such as the squirrel. With practice, the bark and squeal of the squirrel can be made by striking and rubbing a peg against a friction surface.

SUMMARY OF THE INVENTION

My invention comprises a multiple piece, friction and air-operated multifunction game call with which a hunter may imitate all of the important calls of the wild turkey, and some calls of other game animals. The major structural features are transformable into different configurations to accomplish the different goals.

The preferred call comprises of a blade-like, sounding vane attached to a small plastic or wooden ring via a timing cord. The ring is held in the hand of the hunter and the sounding vane is whirled by the timing cord in a circle. As the sounding vane moves through the air, beveled edges on the vane cause the vane to spin. As it contacts the air, the spinning vane emits a low frequency drumming sound that can be made to duplicate the "Pulmonic Puff" of the wild turkey gobbler.

The twisting resistance of the timing cord controls the sound duration of the call. When the cord's twisting resistance equals the pressure of the air on the sounding vane, the vane stops spinning and consequently the sound stops. The correct duration of the "Pulmonic Puff" is achieved by the correct timing cord length. The longer the cord, the more twists it will take to reach the resistance point. Cord resistance also varies with the material used (e.g., plastic, leather, cotton cord, etc.), and the proper cord length is determined by simple experimentation.

Preferably four radially, spaced apart holes are defined in the ring's outer perimeter. The first hole, which enables the timing cord to be attached, is preferably located in the upper half of the ring, aligned with the vertical centerline of the ring body. There are three threaded holes in the lower half of the ring body that are angularly spaced apart. The middle threaded hole is located on the vertical centerline and extends through the lower ring body. It is concentric to the upper body timing cord hole. In the best mode, two outer threaded holes have center lines that form an included angle of approximately 50 degrees, each of which is 25 degrees to the right and left of the vertical center line. The outer holes are threaded to a depth of 0.375 inches.

The outer threaded holes each receive a striker rod constructed of a desired material. In the best mode, the first striker rod is made of plastic, which is desired by some hunters. The second striker rod is made of hardwood. Each striker rod has a threaded end, making attachment or removal of the rod easy. Replacement striker rods threadably fit the ring body.

The middle threaded hole in the lower half of the ring body mounts a hollow, suction tube that enables the call to function as a "wing bone" type device. The tube, being constructed of metal, also functions as a mount for a box call described hereinafter. The suction tube also stabilizes the call during use when the striker rods are frictionally rubbed upon a sound-producing surface. When a striker rod is held between the thumb and index finger as is common practice, the central area of the suction tube will contact the upper surface of the hand near the juncture of the thumb and the hand. This contact prevents random rotation of the striker rod. A problem with common striker rods is that end placement on the friction surface is entirely random and the resulting sound cannot be accurately anticipated.

In the best mode a special ceramic "bisque" friction disk is mounted on the vane. The exposed disc surface is frictionally contacted by a striker rod to produce sounds commonly associated with "peg and slate" type turkey calls. Desired sounds include the "yelp," "cluck," "whine," and "purr" of the wild turkey, the "bark" and "squeal" of the squirrel, and the distress squeal of the cottontail rabbit. The system functions in either wet or dry conditions. The spaced apart vane edges are each beveled approximately thirty degrees in the best mode, and the edges are also parallel.

A "box call" type function results from a pivoting sound box. The preferred sound box is generally rectangular and wooden. The box comprises a central support structure with a mortise opening closed by opposed, glued-in-place, sounding boards with arcuate outer edges. The suction tube projecting from the ring assembly slidably penetrates the sound box to mount it. The ring is releasably mounted to a central hub, and is rotatable within a plane parallel to the vane. Tile sound board may be manually grasped and swept back and forth in an are to rub the recessed friction disc at the vane's end. When the accurate edges of the sound generating regions of the box are aligned over the disk, the "box call" emulation occurs.

Two padded, wing-shaped stop tabs are glued to one end of the sound box in opposed position to each other. The pivotal striking range of the sounding boards is limited by the wing-shaped stop tabs on the outside surface of the box. Movement limits are established by contact with the striker rods and the stop tabs.

The preferred hub comprises a wooded parallelipiped. An elongated, open-ended slot slidably receives the sounding vane. An upper portion of the hub mounts a semicircular shaped dome that loosely fits within the center of the ring. A retainer is secured to the dome with an elastic cord. The retainer may be drawn through the inside of the ring, twisted transversely, and subsequent released to hold the ring against the dome. Yieldable tension is maintained by the elastic cord so the box may move appropriately as the box is drawn over the vane to frictionally produce sounds.

Thus, it is a broad object of the present invention to provide a high quality multifunction game call that combines distinctly different types of turkey calls and other animal calls into one easily-accessible and easily-carried assembly that enables the hunter to produce a wide variety of sounds.

Another broad object is to provide a game call characterized by the unique capability of imitating all of the important calls of wild turkeys.

Another object is to provide a game call of the character described that can produce the sound of an older "wing bone" call.

Another object is to reproduce the "Pulmonic Puff" sound of the turkey gobbler.

Another object is to provide a call of the character described that can produce the sound an older "peg and slate" call can produce.

Another primary object of the present invention to provide a turkey call that not only emulates older "peg and slate" calls, but can replicate the turkey gobbler "Pulmonic Puff" sound.

It is a further object of the present invention to provide a manageable, inexpensive, and easy to manufacture call assembly that combines the "drumming" call and its own new call method with the most preferred calls and call methods of today.

Another object is to provide a call that is easy to carry, and that presents quick and efficient access to its various call options.

It is another object of the present invention to provide a "peg and slate" type call that has a means by which the peg placement against a friction surface can be registered so as to aid in producing consistent and therefore correctly anticipated call notes.

It is another object of the present invention to provide a multifunction game call that can be easily carried around the neck of the user and provide rapid accessibility to call functions.

It is another object of the present invention to provide an improved call that can be used in all weather conditions with wood or plastic strikers. It is a feature of this invention that an improved friction material is employed.

These and other objects and advantages of the present invention, along with features of novelty appurtenant thereto, will become apparent in the course of the following descriptive sections.

BRIEF DESCRIPTION OF THE DRAWINGS

In the following drawings, which form a part of the specification and which are to be construed in conjunction therewith, and in which like reference numerals have been employed throughout wherever possible to indicate like parts in the various views:

FIGS. 11 and 12 illustrate operative positions that can be alternately assumed in rapid succession to produce the gobble of the turkey gobbler;

FIG. 18 is a top plan view of the preferred sounding vane assembly;

FIG. 19 is an upper side elevation view of the sounding vane assembly;

FIG. 20 is a lower side elevation view of the sounding vane assembly;

FIG. 21 is a bottom plan view of the sounding vane assembly;

FIG. 22 is a left end elevation view of the sound vane assembly;

FIG. 23 is a right end elevation view of the sounding vane assembly;

DETAILED DESCRIPTION

Figure 1:
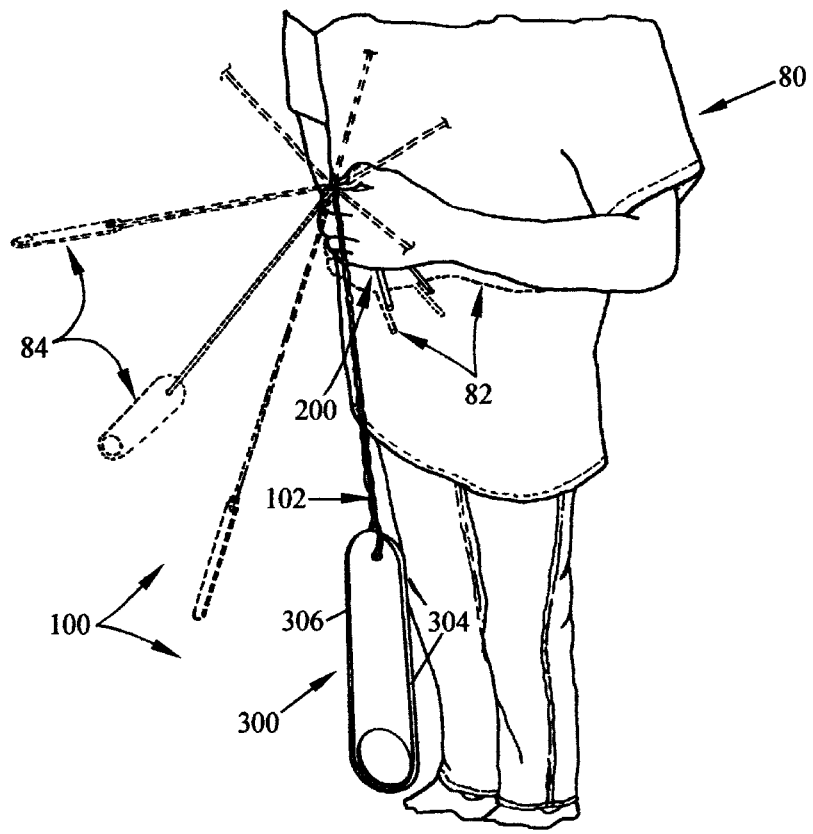
FIG. 1 is a fragmentary pictorial view illustrating use of the vane by a hunter to produce the desired Pulmonic Puff sound.

With reference now to the appended drawings, a first embodiment of an air impact operated, suction operated and friction operated multi-function hand held game call constructed in accordance with the best mode of the present invention has been generally designated by the reference numeral 100. Call 100 comprises a ring assembly generally indicated by the reference numeral 200, a plastic or wooden sounding vane generally indicated by the reference numeral 300, and a timing cord 102 connecting the two assemblies. The cord in the best mode is between sixteen to twenty inches long, with eighteen inches preferred. The cord enables sounding vane 300 to be twirled or spun around against the air by the hunter 80 in FIG. 1 to produce the "Pulmonic Puff" sound of the wild turkey gobbler.

As indicated in FIG. 1, when employing the call to make the "Pulmonic Puff" sound of the turkey gobbler, it is preferred that the hunter 80 will hold the ring assembly in hand and by moving the hand in a close, generally circular motion 82 will cause the timing cord 102 and the sounding vane assembly 300 to revolve around in a generally circular manner indicated by the dashed lines 84. This will in turn impart air pressure on the sounding vane edges 304 and 306, alternately causing the sounding vane to spin and emit a low frequency vibrating sound (v-o-o-r-r-r-r-o-o-m-mi) which sufficiently duplicates what scientists call the "Pulmonic Puff" sound the turkey gobbler makes while strutting. Hunters most often refer to this sound as the "drumming" call.

Of great importance to the correct rendering of this sound is the timing or duration of the sound. During this timing cycle a sound varying between 60 to 75 hz. can be achieved. In actual hunting tests, the preferred sound is approximately 65.15 hz., starting and stopping in an approximately 1.5 second interval, with maximum amplitude achieved in the middle of the cyclic interval. By adjusting the length of the timing cord 102, a correct cycle time of one and one half seconds duration can be achieved. This is so because as the sounding vane spins, the cord twists until the resistance to twisting is greater than air pressure on the sounding vane. At this point a snap back or recoil occurs and the cord returns to its beginning state, thus interrupting the sound for a time until the sound vane can begin spinning again. At this time, the hunter can stop twirling the sounding vane or repeat the call as he or she desires.

In the best mode the wooden or plastic vane weighs between approximately one to two ounces, with 1.5 ounces preferred. Its thickness can vary between 0.125 inches to 0.25 inches, with a preferred thickness of approximately 3/16 inches. The width varies between one and three inches, with two inches preferred The length can vary between six and twelve inches, with eight inches length preferred.

Figure 2:
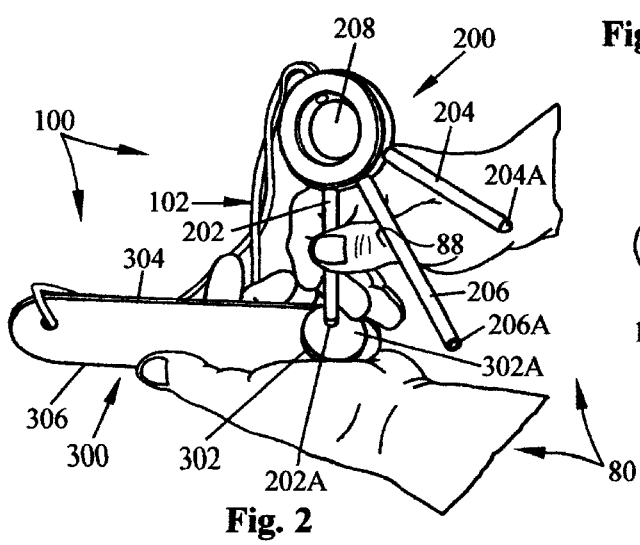
FIG. 2 is a fragmentary pictorial view illustrating my game call deployed in the "peg and slate" mode.

As indicated in FIG. 2, it is preferred that the hunter 80 rub the associated elongated hardwood striker rod end 202A or the optional associated elongated plastic striker rod end 204A against the top frictional surface 302A of the ceramic bisque disc 302 to produce a plurality of game sounds.

A most important benefit of the location of the rods 202, 204 relative to suction tube 206 is that a positive means is provided for bracing the call. The midsection of tube 206 lays across the thumb area 88 of the hunter 80. This makes it possible for the consistent placement of the angular, flat wear-spot that develops on surface of each peg end as it is rubbed against the friction surface 302A as each call sound is practiced. Without this registering means, the hunter or competitior caller has no way of knowing with any degree of accuracy if the first sound produced will be as he expects. The hunter in the field must make very low sounding calls with his striker until he gets it right and hope the turkey does not hear his mistakes. He must maintain the orientation of his grasp on the striker rod once he gets the call sound right, for if he lays it down he must start over. The competition caller on the other hand is not allowed to make low practice calls. He must make a series of like calls and is judged on his ability to do so.

Figure 3:
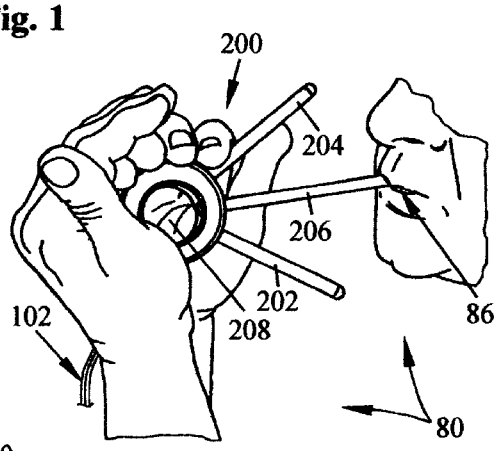
FIG. 3 is a fragmentary pictorial view illustrating the "wing bone" mode for producing the yelp and cluck of the wild turkey.

As indicated in FIG. 3, it is preferred that the hunter 80 employ the open, hollow end 206A (best viewed in FIG. 2) of suction tube 206 in the manner that is commonly associated with the method used to operate the turkey "wing bone" type call. The sounds are produced by the hunter pulling air in through the hollow tube 206 in short or long pulls while variably applying pressure with his or her lips 86 to the end of the tube 206A, and by alternately opening and closing the hands around the aperture 208 of the ring assembly 200 to form a sound chamber, and in combination thereby produce a plurality of sounds. Suction tube 206 is preferably metal.

Figure 4:
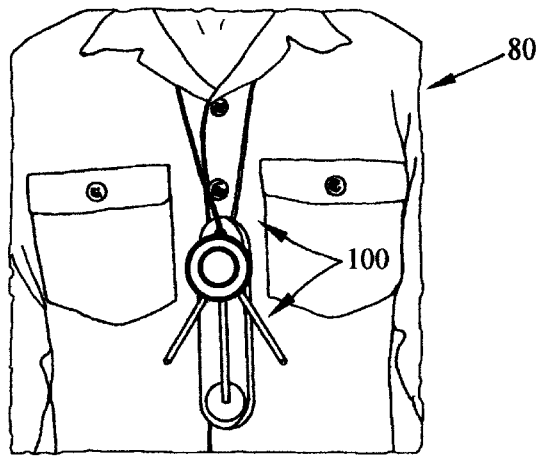
FIG. 4 is a fragmentary pictorial view illustrating the preferred manner of carrying the game call.
Figure 5:
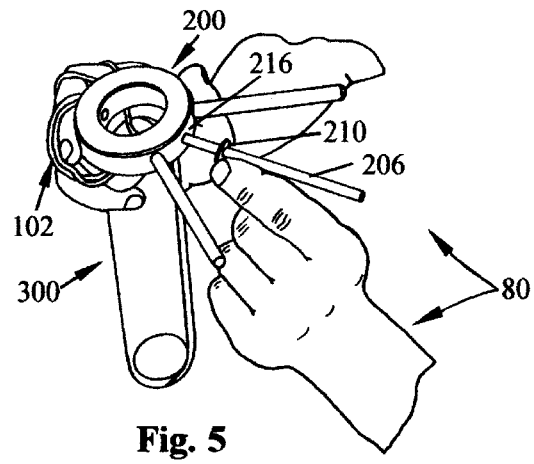
FIG. 5 is a fragmentary pictorial view illustrating the first step in the "box call" function assembly process—installing the front rubber retaining washer on the suction tube.

As indicated in FIG. 4, the preferred method of carrying the first embodiment of the present invention 100 is around the neck of the hunter 80.

Figure 6:
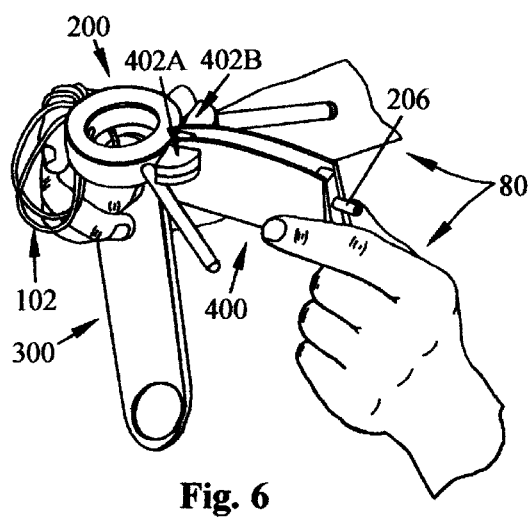
FIG. 6 is a fragmentary pictorial view illustrating the second step in the "box call" function assembly process—installing the sound box on the suction tube.
Figure 7:
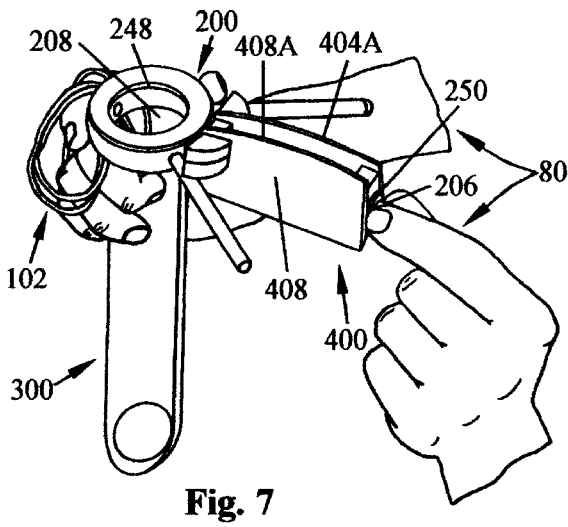
FIG. 7 is a fragmentary pictorial view illustrating the third step in the "box call" function assembly process—installing the rear rubber retaining washer on the suction tube.

With reference primarily directed to FIGS. 5–12, the "box call" assembly 600 comprises a flat rubber washer 210 placed on suction tube 206 and moved to within a short distance of the outer ring face 216. The flat rubber washer 210 will now serve as a stop for the next part to be installed. In FIG. 6, the sound box assembly 400 (the construction of which is later described in detail in FIGS. 26–30) is installed on the suction tube 206 with wing-shaped stops 402A, 402B facing ring face 216. In FIG. 7, a final rubber washer 250 is placed on suction tube 206 at the end of sound box 400 and serves to retain the sound box in a working position.

Figure 8:
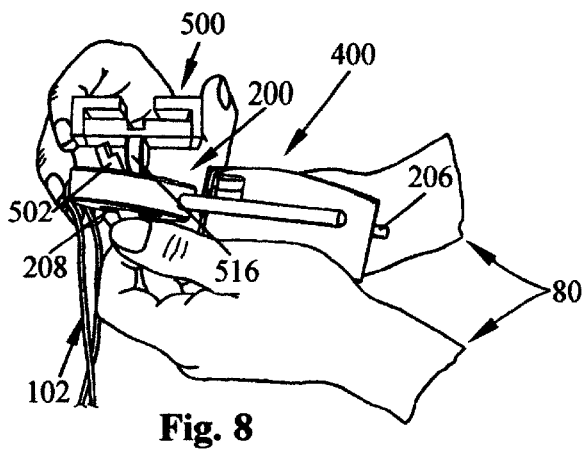
FIG. 8 is a fragmentary pictorial view illustrating the beginning of the fourth step in the "box call" function assembly process.
Figure 9:
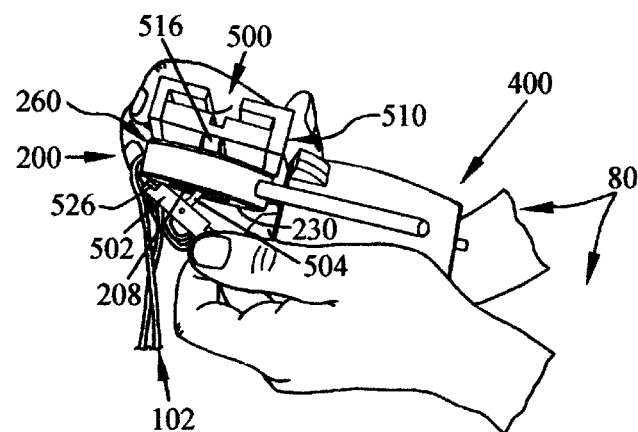
FIG. 9 is a fragmentary pictorial view illustrating the ending of the fourth step in the "box call" function assembly process—hub retainer ready to snap into the latch position.

As seen in FIG. 8, the hub assembly 500 can secure the ring assembly 200 by first inserting the hub retainer 502 through aperture 208 in the ring assembly. In FIG. 9, the retainer 502 is positioned in relation to the bottom face 230 of ring 260 so that the bar end pads 526, 528 will make firm contact with face 230 when the elastic rubber strap 504 is allowed to exert pull on the retainer when released by the hunter 80. Once hub assembly 500 is in place as described, the hub body 510 can be tilted by hand in any direction and will snap back to its aligned position automatically when released.

Figure 10:
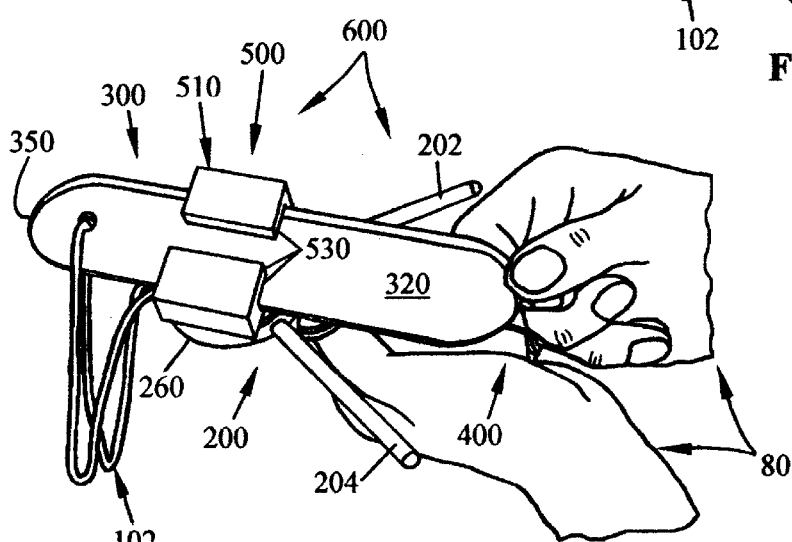
FIG. 10 is a fragmentary pictorial view illustrating the fifth and final step in the "box call" function assembly process—inserting the sounding vane into the hub means.

As shown in FIG. 10, the final step in transforming my call for the "box call" function is the insertion of the sounding vane 300 through the slot 530 of the hub body 510. The sounding vane is inserted into hub body aperture with the timing cord end 350 pointing away from the hunter 80 and with surface 320 facing away from ring assembly 200. The hub body aperture is of a size that just allows a sliding fit for the sounding vane body 322. The friction disc 302 is of a size that will prevent the sounding vane from being completely removed when moved forward. The ceramic disk is made from materials available from Adventures in Ceramics, Waukesha, Wis. 53186.

Figure 11:
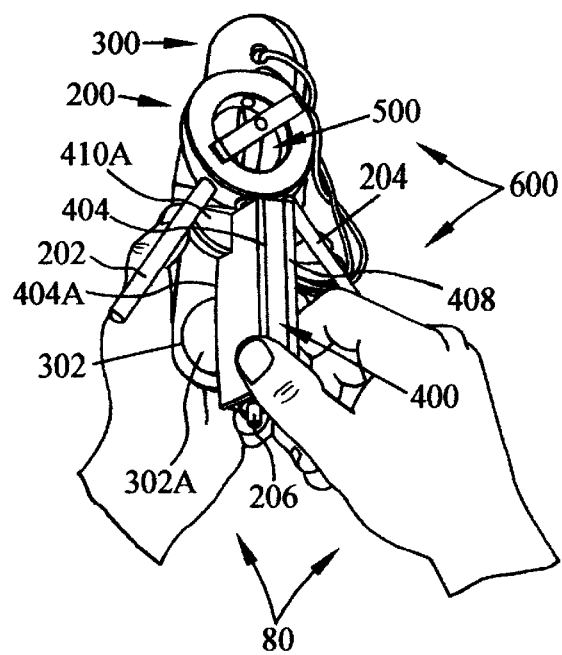
FIG. 11 is a fragmentary pictorial view illustrating a "box call" mode.
Figure 12:
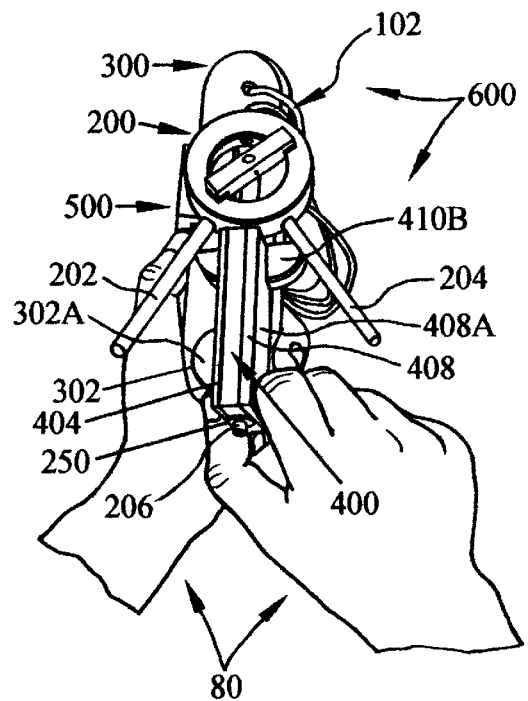
FIG. 12 is a fragmentary pictorial view illustrating another box call mode.

With reference now to FIGS. 11 & 12, a second embodiment extends the functional capabilities of the first embodiment to include the functions commonly associated with the "box call" type turkey call. The method of using the box call assembly 400 to emulate the gobble call of the turkey gobbler can best be visualized by looking quickly from FIG. 11 to FIG. 12 and then back again in rapid succession. The high pitched sound-generating region 408A of the box call assembly 400, better viewed overall in FIG. 12, is being struck against friction surface 302A of the ceramic bisque disc 302 in FIG. 11. The low pitched sound-generating region 404A, better viewed overall in FIG. 11, is being struck against disc surface 302A in FIG. 12. With a little practice the proper cadence can be achieved for producing the gobble call of the turkey. When the call is pivoted on tube 206, the arc of travel for the sound-producing regions is controlled by the wing stop pads 410A, 410B as they each in turn contact striker rods 202, 204. By positioning the box 400 on tube 206 closer to or further away from the outer ring face 216, the arc of travel can be adjusted and maintained by stop washers 210, 250 (see FIGS. 5–7). By utilizing this method to control the arc travel distance of the sounding boards 404 and 408, consistency and predictability in calling is greatly improved over known box call designs. Also, applying either of the sound boards in singular fashion to the friction disc will produce a high or low pitched yelp, cluck, or whine of the turkey as the hunter desires.

Figure 13:
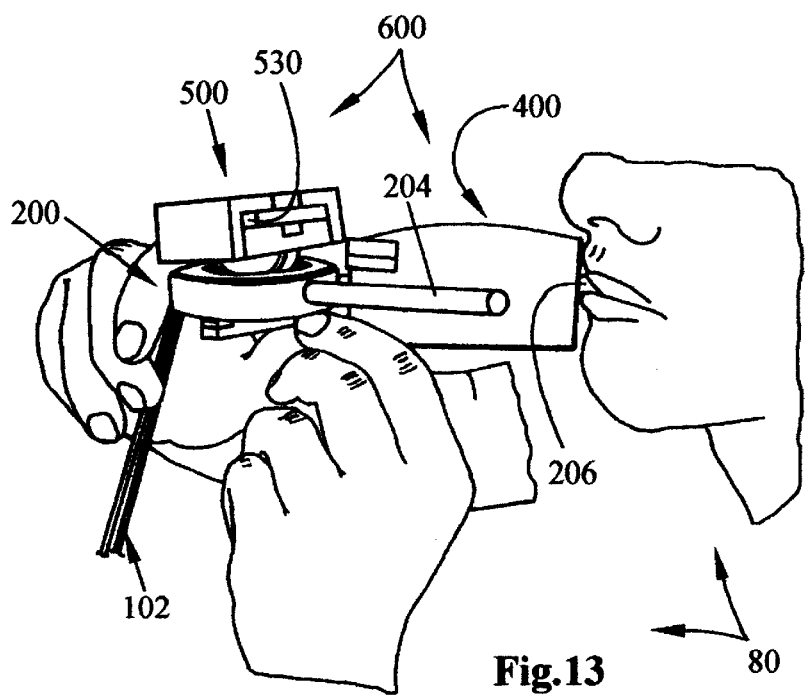
FIG. 13 is a fragmentary pictorial view of the "wing bone" mode, demonstrating that the preferred handling of the suction tube.

In FIG. 13 it is seen that the attachment of the box call assembly 400 and hub assembly 500 to the ring assembly 200 does not interfere with the "wing bone" type call function described earlier in FIG. 3.

Figure 14:
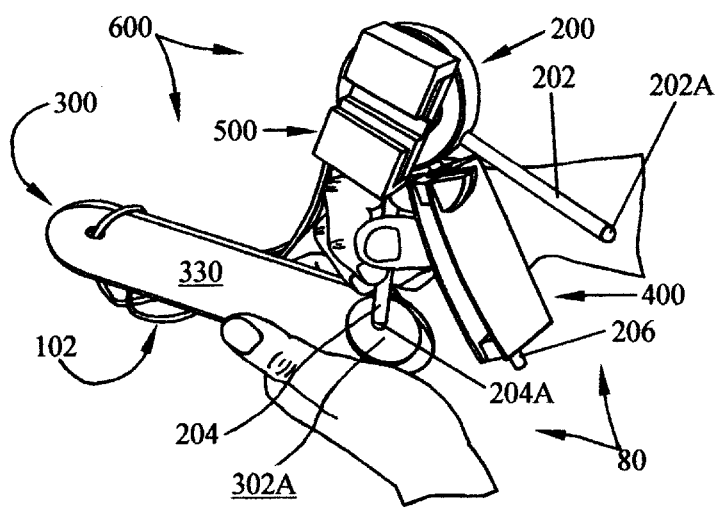
FIG. 14 is a fragmentary pictorial view of the "peg and slate" mode.

In FIG. 14 it is seen that the attachment of the box call assembly 400 and hub assembly 500 to the ring assembly 200 does not interfere with the "peg and slate" type call function described earlier in FIG. 2.

Figure 15:
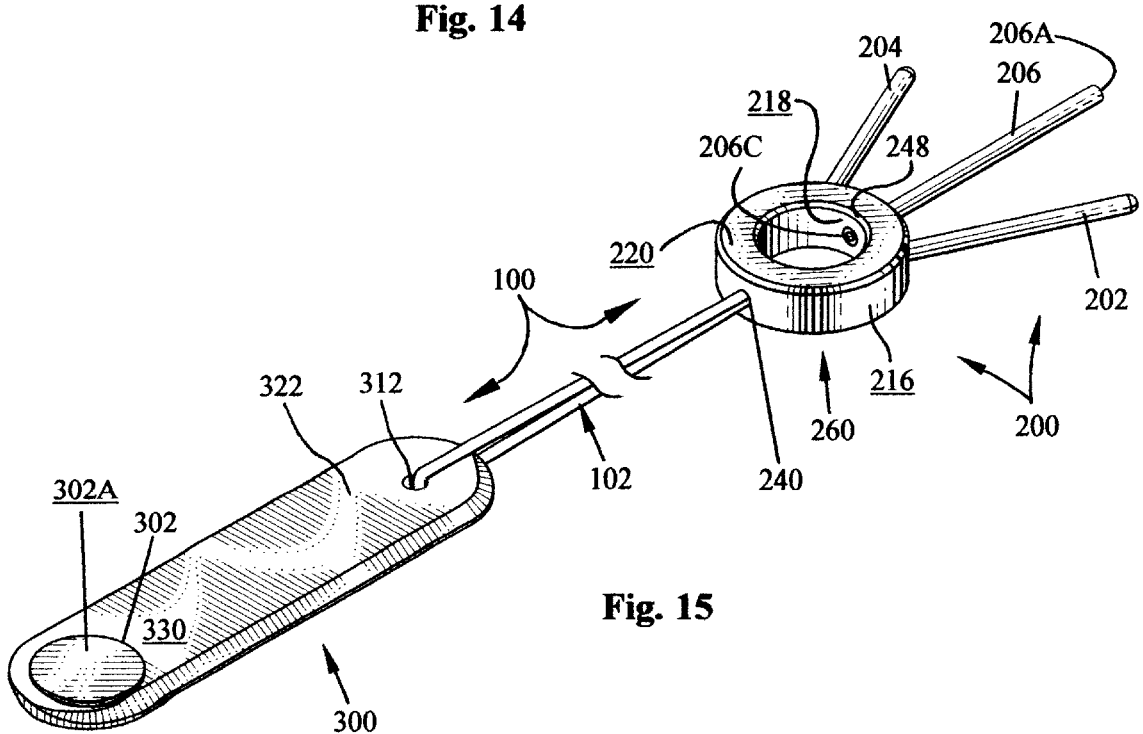
FIG. 15 is an isometric view of the basic multifunction game call constructed in accordance with the best mode of the present invention, and with the vane dissociated from the hub.

With reference now to FIG. 15, the ring assembly 200 is conjoined with sound vane assembly 300 via timing cord 102 to form the first embodiment 100. The timing cord is preferably made of a plastic of suitable pliancy that will allow continued use without distortion or breakage. Proper cord length is determined by inserting a length of cord through aperture 312 in vane body 322 and holding the loop together with the fingers at different points along the length while whirling the sound vane 300. The preferred cord length of approximately eighteen inches is achieved with plastic or leather cord. Prior to revolving the cord to spin the blade, the cord should be twisted, in the best mode. As it whirls the blade will produce cyclical sounds that are periodically repeated. The preferred sound frequency is approximately 65.15 hz., with maximum amplitude occurring in the middle of a one and one half second cycle. The user can experiment with cord length by pinching it together along its length for a shorter duration. When the desired parameters (i.e., frequency and cycle time) are achieved through testing during manufacture, the cord is cut and the ends are glued into ring aperture 240.

Figure 16:
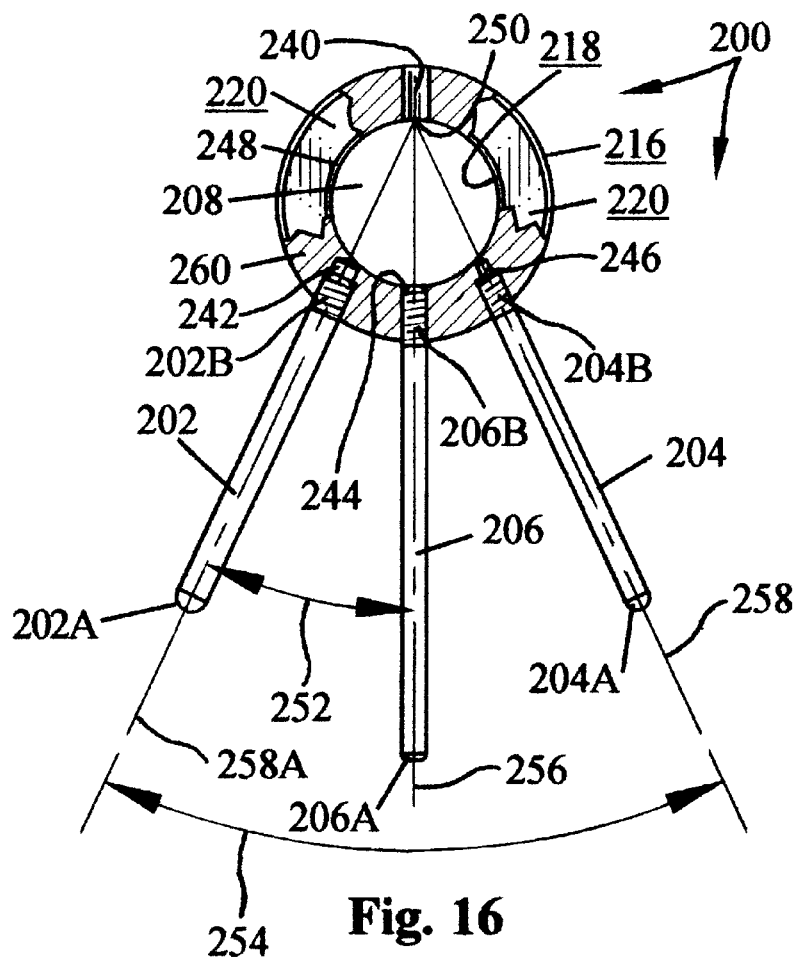
FIG. 16 is a top plan view of the ring assembly with portions broken away or shown in section for clarity.
Figure 17:
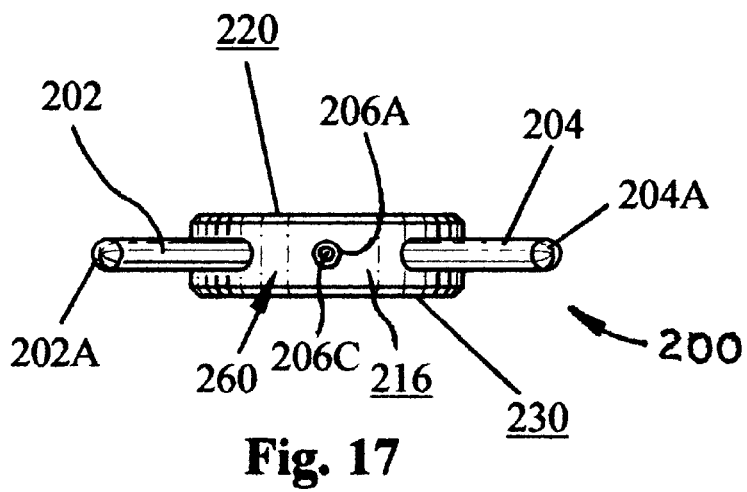
FIG. 17 is a front end elevation view of the ring assembly of FIG. 16.

FIGS. 16–17 show the detailed construction of ring assembly 200. In FIG. 16, ring body 260 is preferably constructed of injection molded plastic. The ring body 260 has a top planar surface 220 and a bottom planar surface 230 (FIG. 17) which are spaced apart from one another in generally parallel relation. The ring body as viewed from top or bottom would reveal an annular inner face 218 and a spaced apart, generally concentric, annular outer face 216 (FIG. 16). The preferred ring is a plastic toroid with an outside diameter of approximately 2.5 inches, an inner diameter of approximately 1.5 inches, and a thickness of approximately 0.625 inches.

Aperture 208 that acts as a sound muffling or amplifying area when enclosed by the hunter's hands when the suction tube 206 is employed (FIG. 3). Also, aperture 208 makes it possible to insert latch 502 through the ring body 260 so as to allow dome 516 to function like a ball and socket connection against the ring edge 248 (FIGS. 8–9).

With reference to FIG. 16 threaded hole 244 is preferably drilled and tapped inline with the drilled timing cord hole 240. Threaded hole 242 is drilled and taped at an angle of 25 degrees 252 to the left of hole 244. Threaded hole 246 is drilled and tapped at a 50-degree angle 254 to the right of hole 242. The elongated striker rod 202 is provided with a threaded end 202B and a rounded end 202A and is preferably constructed from hardwood. The elongated striker rod 204 is provided with a threaded end 204B and a rounded end 204A and is preferably constructed of Styrene plastic. Suction tube 206 is provided with a threaded end 206B and a suction end 206A and is preferably constructed of hollow aluminum tubing.

The preferred sounding vane assembly 300 is shown in FIGS. 18–25. In the best mode, the approximate dimensions of the sounding vane are as follows: a length of eight inches; a width of two inches, and a thickness of three sixteenths inches. The vane is preferably rounded to a one-inch radius at each end. A hole near one end of the vane is provided for insertion of a timing cord end after which a loop is formed, with the vane contained, by joining the ends of the cord together and gluing them into the hole provided in the ring body. Near the opposite end of the vane there is located a generally circular recessed area formed in the elongated planar surface. Preferably inlaid within this recess is a thick kiln-fired, ceramic sound-producing disc. In the best mode the disk is approximately one and one-half inches in diameter, and approximately 0.187 inches thick. When sanded lightly, the exposed disc surface can then be frictionally contacted by the end of the desired striker rod to produce turkey call sounds commonly associated with "peg and slate" type turkey calls, in either wet or dry weather conditions.

The elongated, generally spaced apart edges of the vane are each beveled at a 30-degree angle. It can be seen by viewing either end of the vane that the 30-degree bevels are parallel. One angle would be seen as beginning at the edge of one elongated planar surface of the vane and the other as beginning at the edge of the opposite elongated planar surface, with each angle ending short of its opposed planar surface. The preferred result is a one-sixteenth inch high flat edge that is perpendicular to its connecting planar surface, thus extending around each side of the vane with each edge terminating at the apex of the vane's rounded ends.

Figure 24:
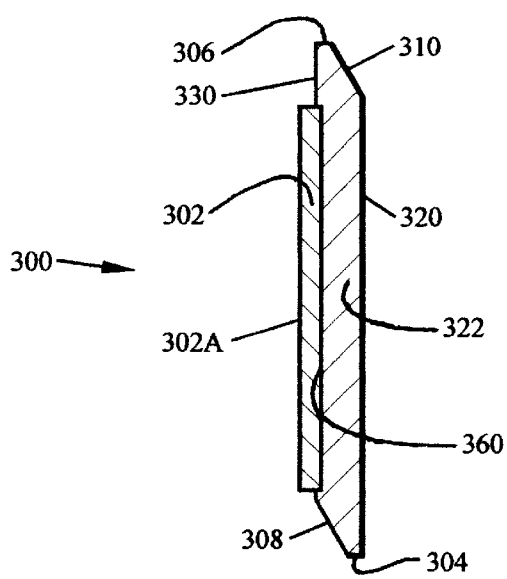
FIG. 24 is a sectional view taken generally along line 24—24 of FIG. 18.
Figure 25:
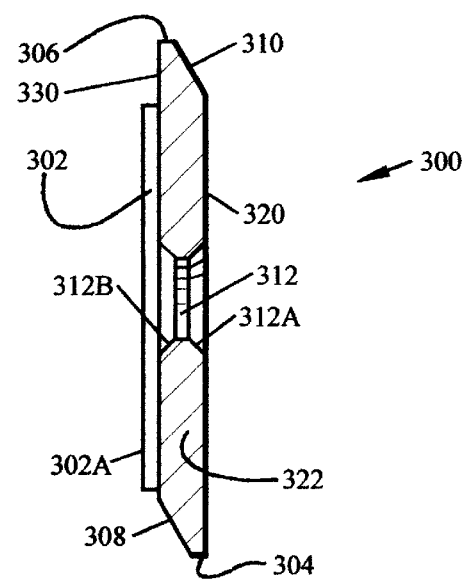
FIG. 25 is a sectional view taken generally along line 25—25 of FIG. 18.

The vane body 322, shown in cross section in FIGS. 24–25, is preferably comprised of styrene plastic and includes a rounded leading end 350 (FIGS. 18 and 23) and an opposite rounded trailing end 352 (FIGS. 18 and 22). Both rounded leading and trailing ends are transversely oriented relative to both the elongated planar surface 330 (FIG. 18) and the spaced apart, opposite, elongated planar surface 320 (FIG. 21) of vane body 322. Similarly, an edge surface 306 (FIG. 19) is spaced apart and generally parallel to an opposite edge surface 304 (FIG. 20). The vane edges are intersected by angles 308, 310 (FIGS. 22–23) which are parallel to one another. Each angle is 30 degrees to its respective, connecting, elongated planar surface—angle 304 with surface 330, angle 310 with surface 320 (FIGS. 24–25).

It will also be noted that vane body 322 preferably comprises a through hole 312 near rounded leading end 350 (FIG. 18), said through hole having beveled ends 312A, 312B (shown in cross section in FIG. 25) for reducing wear on the later installed timing cord 102 (FIG. 15). Also, the preferred vane body 322 (FIG. 24 will have a shallow circular recess 360 near the rounded trailing end 352 sized to receive the thin circular ceramic bisque friction disc 302 within.

Figure 27:
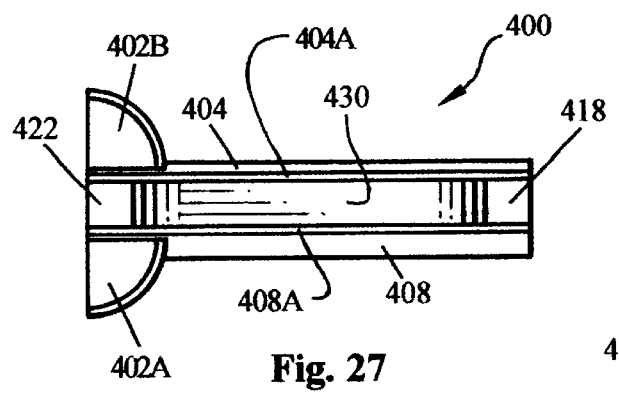
FIG. 27 is a top plan view of the preferred sound box assembly.
Figure 30:
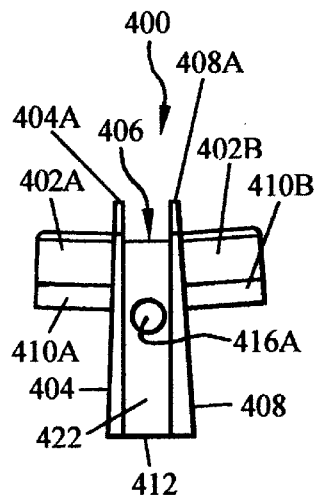
FIG. 30 is a left end elevation view of the sound box assembly.
Figure 29:
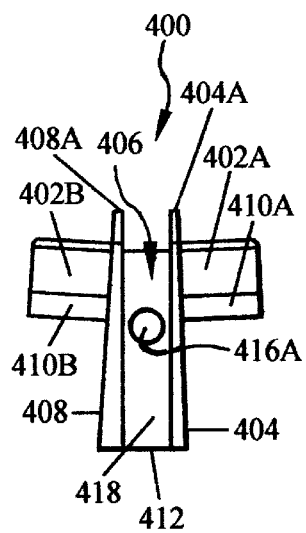
FIG. 29 is a right end elevation view of the sound box assembly.
Figure 26:
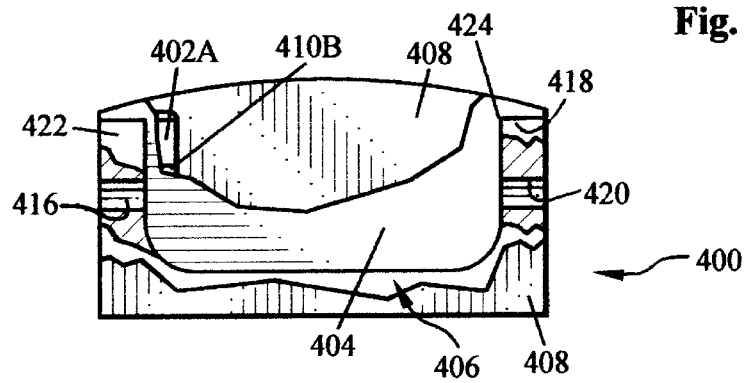
FIG. 26 is a bottom side elevation view of the sound box assembly.
Figure 28:
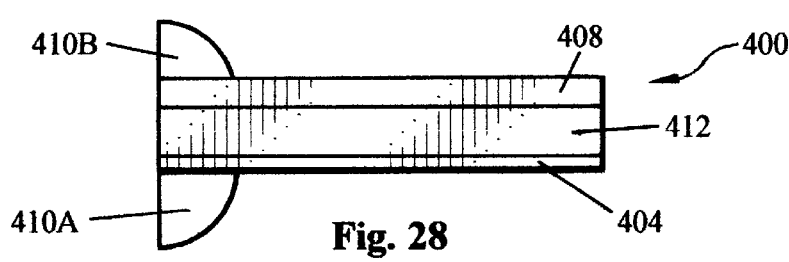
FIG. 28 is a bottom plan view of the sound box assembly.
Figure 32:
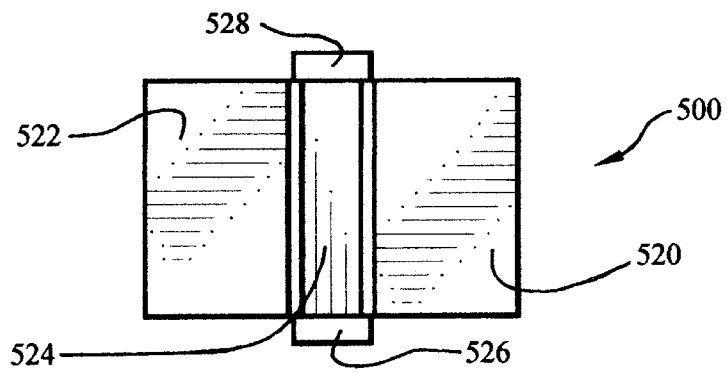
FIG. 32 is a top plan view of the preferred hub assembly.
Figure 31:
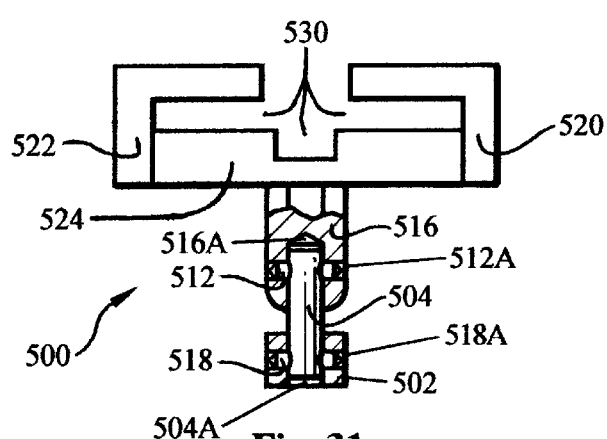
FIG. 31 is an end elevation view of the hub assembly with portions thereof cut away or shown in section.
Figure 34:
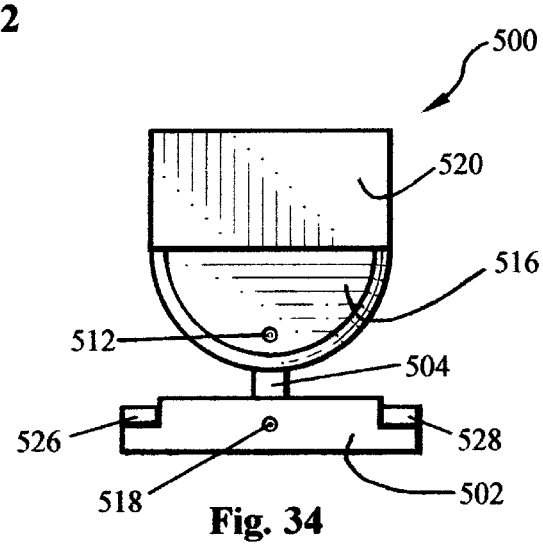
FIG. 34 is a right side elevational view of the hub assembly.
Figure 33:
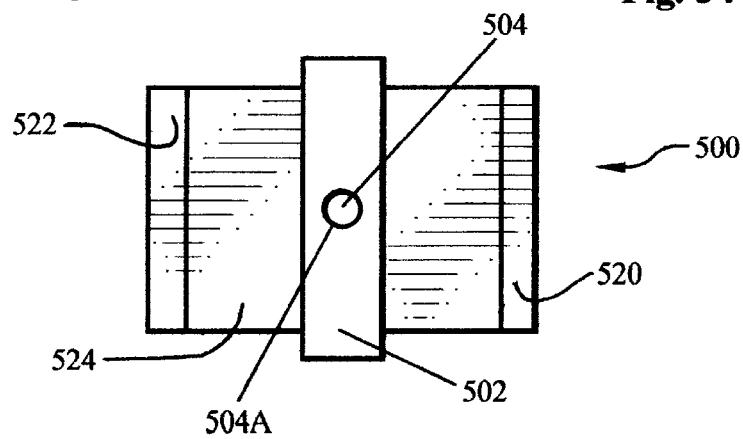
FIG. 33 is a bottom plan view of the hub assembly.

The exposed upper surface 302A of disc 302 will serve as the friction-rubbing surface for the assorted striker rod ends 202A, 204A (FIG. 14) and sound-generating regions 404A, 408A of the box call 400 (FIG. 27). The preferred sound box assembly 400 is shown in FIGS. 26–30. A hard plastic support piece 406 includes a generally flat bottom wall 412, a leading end wall 422, and a generally parallel, spaced apart, trailing end wall 418 (FIGS. 26–28). Generally parallel, opposing, styrene plastic or hardwood sounding boards 404, 408 (FIGS. 29 and 30) are each bonded to the sides of said plastic support piece in generally perpendicular relationship to the bottom wall 412, forming an acoustical chamber portion 430 open at the top portion 424 and opposite the bottom wall 412. Sounding boards 404, 408 have sound-generating regions 404A, 408A (FIG. 27) for rubbing against friction surface 302A (FIGS. 11 and 12).

The support piece 406 further includes concentric through holes 416, 420 that, when aligned, form a passageway 416A (FIGS. 26, 29 and 30) extending through leading end wall 422 and trailing end wall 418 for receiving suction tube 206 (FIG.6). The sound box assembly includes a pair of hard, plastic, wing-shaped stops 402A, 402B and joined foam rubber stop pads 410A, 410B. Each pad is joined in opposing fashion at the leading end of the sound box at the desired position on the sounding boards so as to effect the correct amount of arc travel of the sound-generating regions 404A, 408A when the sound box assembly 400 is in working position (FIGS. 11 and 12) on suction tube 206.

The preferred hub assembly 500 is shown in FIGS. 31–34. Hard plastic angle pieces 522, 520 are glued to base 524 (FIG. 31) with the upper angle legs facing inwardly, forming a generally rectangular-shaped outer body with a central slot 530 sized to slidably fit sounding vane 300 (FIG. 10) and form a guide way for said vane.

Projecting perpendicularly downwardly from base 524 is an upright dome 516 (FIG. 34) having a semicircular cross section. Dome 516 has at its apex an inwardly bored hole 516A (FIG. 31) for receiving an elastic cord 504. The said elastic cord is retained by pin 512 which is inserted into through hole 512A and pushed through the elastic cord end therein. Next, the opposite free end of core 504 is inserted into through hole 504A in the elongated, generally rectangular retainer 502 and retained in place by pin 518 which is inserted into through hole 518A and pushed through the elastic cord end therein. Retainer 502 is fitted a each end with soft rubber pads 526, 528 for engaging surface 230 of ring assembly 200 (FIG. 9).

It will be seen from the foregoing that this invention is one well adapted to obtain all the ends and objects herein set forth, together with other advantages which are inherent to the structure.

It will be understood that certain features and subcombinations are of utility and may be employed without reference to other features and subcombinations. This is contemplated by and is within the scope of the claims.

As many possible embodiments of the invention may be made without departing from the scope thereof, it is to be understood that all matter set forth herein or shown in the accompanying drawings is to be interpreted as illustrative and not in a limiting sense.

What is claimed is:

1. A portable hunter's game call for emulating the pulmonic puff sound of the wild turkey, said call comprising:
   an elongated, blade-like sounding vane;
   a timing cord having one end tied to said vane and an opposite end adapted to be grasped for twirling, whereby the vane may be spun in the air by a hunter to emulate "Pulmonic Puff" sounds of the wild turkey gobbler; and,
   wherein the Pulmonic Puff sounds are characterized by a frequency of approximately 65 Hz.

2. The call as defined in claim 1 wherein said vane comprises a weight of approximately one to two ounces, a thickness of between 0.125 inches to 0.25 inches, a width of between one and three inches; and a length of between six and twelve inches.

3. The call as defined in claim 2 wherein:
   said vane weight is approximately 1.5 ounces;
   said vane thickness is approximately 3/16 inches;
   said vane width is approximately two inches; and,
   said vane length is approximately eight inches.

4. The call as defined in claim 2 wherein said vane has a ceramic bisque, frictional surface mounted upon it, and said call comprises a wooden striker adapted to be rubbed against said ceramic bisque surface to produce a turkey-attractive sound.

5. A combination game call transformable between hunting applications, said call comprising:
   a body adapted to be grasped by a hunter;
   a frictional surface spaced-apart from and separate from said body for making turkey-attracting sounds when rubbed;
   striker means supported upon said body for rubbing said frictional surface;
   a separate sounding vane remote from said body for making Pulmonic Puff sounds; and,
   a timing cord comprising a first end connected to said vane and an opposite end coupled to said body for enabling the vane to be spun in a circle in the air by a hunter while grasping said body to produce said "Pulmonic Puff" sound.

6. The call as defined in claim 5 wherein said frictional surface is mounted upon said sounding vane.

7. The call as defined in claim 5 wherein said frictional surface comprises ceramic bisque material.

8. The call defined in claim 5 wherein said frictional surface comprises a ceramic bisque disk attached to said vane.

9. The call as defined in claim 6 wherein said striker means comprises a plurality of radially spaced apart strikers.

10. The call as defined in claim 7 wherein the striker means comprises a wooden striker and a plastic striker.

11. The call as defined in claim 5 further comprising a hollow tube between said wooden and plastic strikers for making "wing bone" sounds when inserted within the mouth of a hunter.

12. The call as defined in claim 11 wherein said hollow tube is positioned to engage the hand of the hunter for bracing the call when said striker means scratches said frictional surface.

13. The call as defined in claim 5 wherein said body comprises a ring upon which said striker means is mounted.

14. The call as defined in claim 13 wherein said cord extends between said ring and said vane.

15. The call as defined in claim 1 wherein said vane comprises a pair of spaced apart and generally parallel opposite edges that are beveled.

16. The call as defined in claim 15 wherein said vane edges are beveled at approximately thirty degrees.

17. The call as defined in claim 15 wherein said vane comprises rounded leading end and an opposite rounded trailing end.

18. A portable, combination game call for making the "Pulmonic Puff" sound of the wild turkey gobbler, said call comprising:
   a body adapted to be grasped by a hunter;
   a frictional surface remote from said body for making turkey-attracting sounds when rubbed;
   striker means secured to said body for rubbing said frictional surface to produce said turkey-attracting sounds;
   a hollow suction tube supported upon said body for making "wing bone" sounds;
   a sounding vane remote from said body; and,
   a timing cord extending between said vane and said body for enabling the vane to be spun in the air by a hunter while grasping said body to produce the "Pulmonic Puff" sound of the wild turkey gobbler.

19. The call as defined in claim 18 wherein said vane comprises a pair of spaced apart and generally parallel opposite edges that are beveled.

20. The call as defined in claim 18 wherein said vane comprises:
   a weight of between approximately one to two ounces
   a thickness of between 0.125 inches to 0.25 inches;
   a width of between one and three inches; and,
   a length between six and twelve inches.

21. The call as defined in claim 20 wherein:
   said vane weight is approximately 1.5 ounces;
   said vane thickness is approximately 3/16 inches;
   said vane width is approximately two inches; and,
   said vane length is approximately eight inches.

22. The call as defined in claim 18 wherein said frictional surface comprises a ceramic bisque disk.

23. A transformable game call that is selectively deployable in a variety of user selected transformable configurations for producing different sounds, said call comprising:
   a hub assembly;
   a ring removably secured to said hub assembly;
   a frictional striking surface;
   a plurality of strikers extending from said ring for making turkey-attractive sounds when rubbing said surface;
   a sounding vane;
   a timing cord extending from said ring to said vane for enabling the vane to be spun in the air by a hunter to produce the "Pulmonic Puff" sound of the wild turkey gobble; and,
   a sound box assembly removably coupled to said call for making a game-attracting sound when rubbed against said surface.

24. The call as defined in claim 23 wherein said frictional surface comprises a ceramic bisque disk attached to said vane.

25. The call as defined in claim 23 wherein said strikers comprise a solid wooden striker, a plastic striker, and a hollow tube for making "wing bone" sounds.

26. The call as defined in claim 23 wherein said hub assembly comprises a slot for removably receiving and at least temporarily securing said vane.

27. A hunter's turkey call comprising:

a frictional surface for frictionally making turkey-attractive sounds when rubbed, said frictional surface comprising ceramic bisque material; and, striker means adapted to be grasped by said hunter for rubbing said ceramic bisque surface to make said turkey-attracting sounds.

28. The call as defined in claim 27 wherein said ceramic bisque surface comprises a disk.

29. The call as defined in claim 27 further comprising a ring upon which said striker means is mounted, and wherein said striker means comprises a plurality of radially spaced apart strikers.

30. The call as defined in claim 29 further comprising a hollow tube on said ring between said strikers for making "wing bone" sounds.

31. A portable game call for bird hunters, said call comprising:

a ring adapted to be grasped by a hunter, the ring comprising an aperture forming a sound chamber;

a hollow sounding tube mounted to said ring and in fluid flow communication with said chamber;

whereby, when said tube is inserted within the mouth of a hunter whose hands cup the ring, the hunter may stick on the tube to make "wing bone" sounds when his hands are alternately closed and opened.

32. The call as defined in claim 31 further comprising a ceramic bisque frictional surface adapted to be rubbed to produce turkey-attractive sounds and striker means secured to said ring for rubbing said surface.

33. The call as defined in claim 32 further comprising blade means for emulating the "Pulmonic Puff" sounds of the wild turkey gobbler.

* * * * *